(12) United States Patent
Yang

(10) Patent No.: US 10,684,427 B2
(45) Date of Patent: Jun. 16, 2020

(54) FIBER OPTIC ADAPTER AND FIBER OPTIC CONNECTOR

(71) Applicant: Muh-Chen Yang, Taipei (TW)

(72) Inventor: Muh-Chen Yang, Taipei (TW)

(*) Notice: Subject to any disclaimer, the term of this patent is extended or adjusted under 35 U.S.C. 154(b) by 0 days.

(21) Appl. No.: 16/210,341

(22) Filed: Dec. 5, 2018

(65) Prior Publication Data

US 2019/0346635 A1 Nov. 14, 2019

Related U.S. Application Data

(60) Provisional application No. 62/670,931, filed on May 14, 2018.

(30) Foreign Application Priority Data

Aug. 28, 2018 (CN) .......................... 2018 1 0990129

(51) Int. Cl.
    *G02B 6/38* (2006.01)
(52) U.S. Cl.
    CPC ......... *G02B 6/3897* (2013.01); *G02B 6/3825* (2013.01); *G02B 6/3893* (2013.01)
(58) Field of Classification Search
    CPC ... G02B 6/3825; G02B 6/3893; G02B 6/3897
    See application file for complete search history.

(56) References Cited

U.S. PATENT DOCUMENTS

| 8,202,009 B2 * | 6/2012 | Lin ........................ | G02B 6/3825 |
| | | | 385/55 |
| 9,323,007 B1 * | 4/2016 | Yang .................... | G02B 6/3825 |
| 9,798,090 B2 * | 10/2017 | Takano ................ | G02B 6/3825 |
| 2005/0111796 A1 * | 5/2005 | Matasek .............. | G02B 6/3825 |
| | | | 385/55 |
| 2019/0146160 A1 * | 5/2019 | Kadar-Kallen ...... | G02B 6/3809 |

* cited by examiner

*Primary Examiner* — Daniel Petkovsek
(74) *Attorney, Agent, or Firm* — Rosenberg, Klein & Lee

(57) ABSTRACT

The fiber optic adapter of the present invention includes a hollow housing, an arm and a protrusion. The arm is disposed in the housing and one end thereof is coupled to the housing. The protrusion is disposed on the arm for engaging with a protrusion on a fiber optic connector. The protrusion on the arm has a first surface, a second surface, a third surface, a fourth surface, a first side face and a second side face. The first, second, third and fourth surfaces are connected to the first and second side faces. The second surface is located between the first surface and the third surface. The third surface is located between the second surface and the fourth surface. The fourth surface is closer to the junction of the arm and the housing than the third surface. The edges formed between the third surface and the second and fourth surfaces are not sharp. The edges are round edges and have a radius of curvature ranged from 0.1 mm to 0.7 mm. The present invention further provides a fiber optic connector.

5 Claims, 9 Drawing Sheets

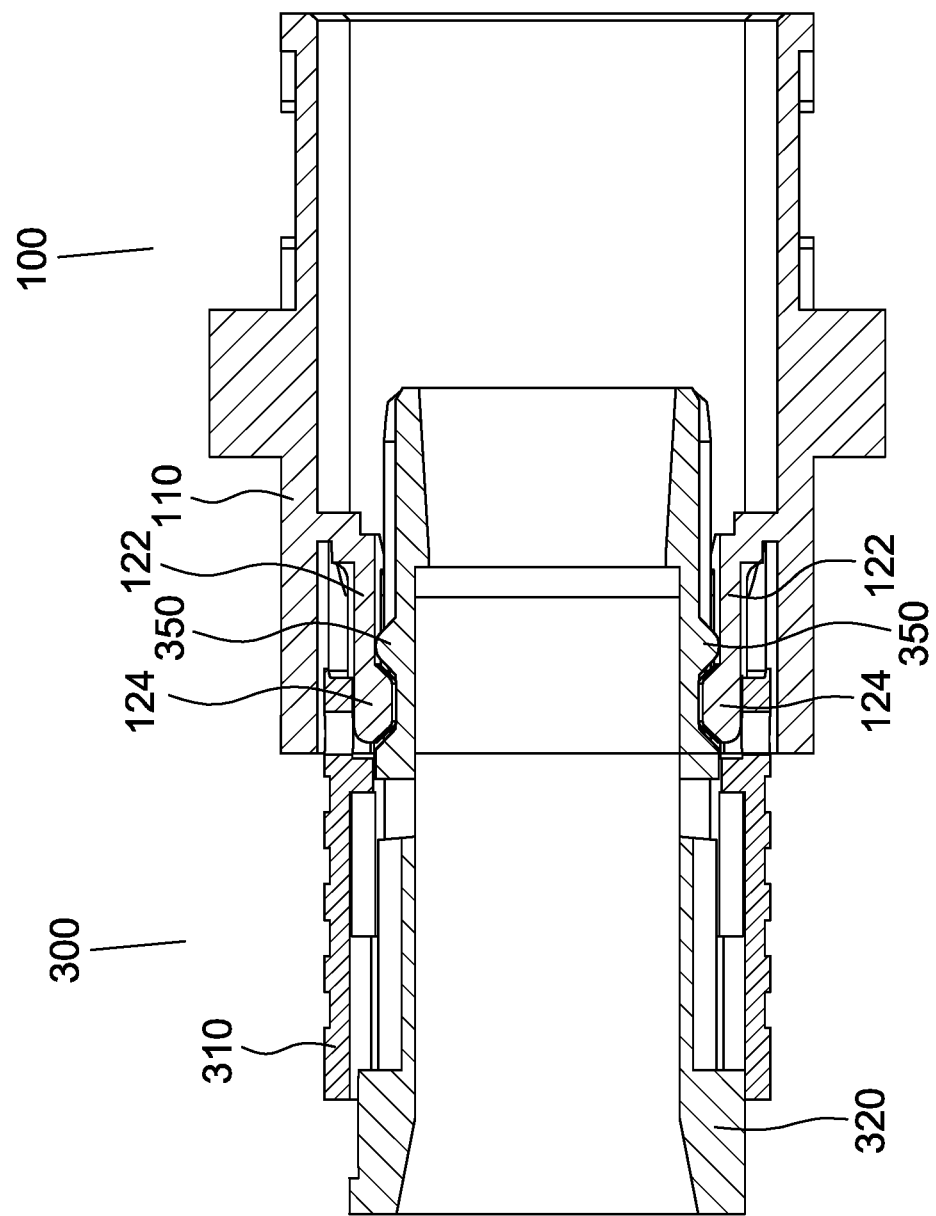

US 10,684,427 B2

FIBER OPTIC ADAPTER AND FIBER OPTIC CONNECTOR

RELATED APPLICATION

The present application claims priority to U.S. Provisional Application Ser. No. 62/670,931, filed on May 14, 2018, and to Chinese Patent Application Number 201810990129.X, filed on Aug. 28, 2018, the disclosures of which are hereby incorporated by reference herein in their entirety.

BACKGROUND

1. Technical Field

This invention generally relates to a fiber optic adapter and a fiber optic connector.

2. Description of the Related Art

The optical fiber has been widely used as signal transmission media because of its high bandwidth and low loss nature. A fiber optic connector is a mechanical device that is located at the end of an optical fiber for connecting two optical fibers to form a continuous optical path. Two fiber optic connectors are mated to each other through an adapter that aligns and holds the fiber optic connectors.

In general, fiber optic adapters are often provided with latches to allow fiber optic connectors to align with one another and maintain the alignment of the fiber optic connectors. When there is a larger friction between the latch and the connector, the connector will not easily slip off the adapter. However, the large friction will cause the surface wear on the connectors and therefore increase the generation of debris.

SUMMARY

The present invention provides a fiber optic adapter.

In one embodiment, the fiber optic adapter of the present invention includes a hollow housing, an arm and a protrusion. The arm is disposed in the housing and one end thereof is coupled to the housing. The protrusion is disposed on the arm for engaging with a protrusion on a fiber optic connector. The protrusion on the arm has a first surface, a second surface, a third surface, a fourth surface, a first side face and a second side face. The first, second, third and fourth surfaces are connected to the first and second side faces. The second surface is located between the first surface and the third surface. The third surface is located between the second surface and the fourth surface. The fourth surface is closer to the junction of the arm and the housing than the third surface. The edges formed between the third surface and the second and fourth surfaces are not sharp. The edges are round edges and have a radius of curvature ranged from 0.1 mm to 0.7 mm.

The present invention further provides a fiber optic connector which includes an outer housing and an inner housing. The outer housing surrounds the inner housing. A second protrusion is formed on an outer surface of the inner housing for engaging with a first protrusion of a fiber optic adapter. The second protrusion has a top surface, a first inclined surface and a second inclined surface, wherein the top surface is located between the first inclined surface and the second inclined surface. The edges formed between the top surface and the first, second inclined surfaces are not sharp. The edges are round edges and have a radius of curvature ranged from 0.05 mm to 0.8 mm.

BRIEF DESCRIPTION OF THE DRAWINGS

Other objects, advantages, and novel features of the present invention will become more apparent from the following detailed description when taken in conjunction with the accompanying drawings.

FIG. 8 is a cross-sectional view illustrating the fiber optic connector of the present invention being inserted into the fiber optic adapter of the present invention.

DETAILED DESCRIPTION OF THE PREFERRED EMBODIMENT

Figure 1:
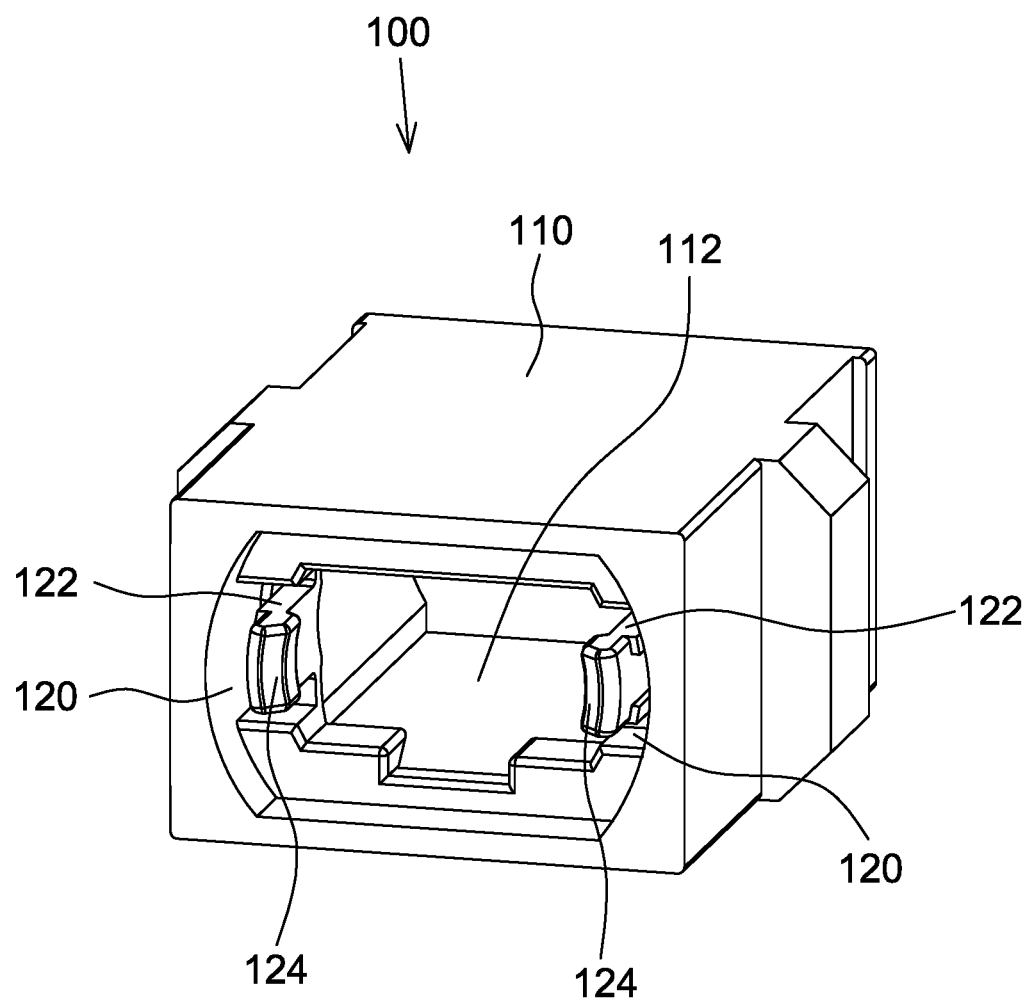
FIG. 1 is an elevated perspective view of the fiber optic adapter of the present invention.

Referring to FIG. 1, the fiber optic adapter 100 of the present invention, such as an MPO type fiber optic adapter, is constructed of plastics by an injection molding process. The fiber optic adapter 100 includes a hollow housing 110 formed by a plurality of side walls. The housing 110 has an opening 112 for insertion of a fiber optic connector. The fiber optic adapter 100 further includes at least one pair of latches 120 disposed within the housing 110. Each of the latches 120 includes an arm 122 with one end fixed to one of the side walls. The arm 122 extends outwardly from the housing 110 toward the opening 112 in an axial direction. In addition, a protrusion 124 is formed on the front end of each of the arms 122, wherein the protrusions 124 on the two arms 122 face each other. When a fiber optic connector is inserted into the fiber optic adapter 100 from the opening 112, the two arms 122 will flex outwardly and then spring back so that the protrusions 124 respectively snap into engagement with the protrusions on the fiber optic connector. The other adapter components are not illustrated in the figures for clarity.

Figure 2A:
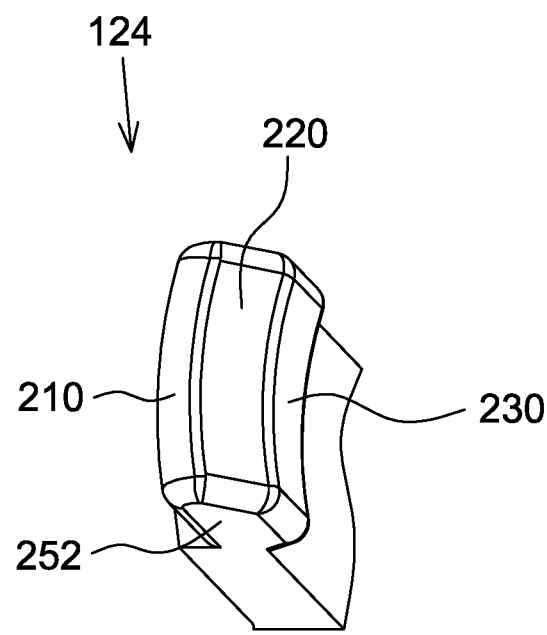
FIG. 2a is a partially enlarged view of FIG. 1 to illustrate the protrusion on the latch of the fiber optic adapter.
Figure 2B:
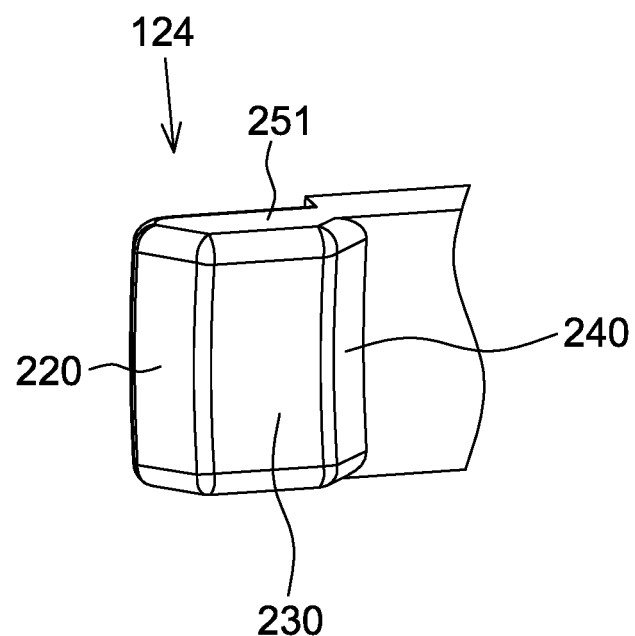
FIG. 2b is another partially enlarged view of FIG. 1 to illustrate the protrusion on the latch of the fiber optic adapter.

Referring to FIGS. 2a and 2b, each protrusion 124 has a first surface 210, a second surface 220, a third surface 230, a fourth surface 240, a first side face 251, and a second side face 252. The first side face 251 is parallel to the second side face 252, and the first surface 210, the second surface 220, the third surface 230, and the fourth surface 240 are located between the first side face 251 and the second side face 252. The second surface 220 is positioned between the first surface 210 and the third surface 230, and the third surface 230 is positioned between the second surface 220 and the fourth surface 240. The first surface 210 and the second surface 220 face the opening 112, and the fourth surface 240 faces away from the opening 112. Further, the second surface 220, third surface 230, and fourth surface 240 on the protrusion 124 face the second surface 220, third surface 230, and fourth surface 240 on the other protrusion 124, respectively.

The first surface 210 is convex and has substantially four sides, wherein two of the four sides respectively abut the first side face 251 and the second side face 252, and one of the other two sides abuts the second surface 220.

The second surface 220 is concave and has substantially four sides, wherein two of the four sides respectively abut the first side face 251 and the second side face 252, and the other two sides respectively abut the first surface 210 and the third surface 230.

The third surface 230 is concave and has substantially four sides, wherein two of the four sides respectively abut the first side face 251 and the second side face 252, and the other two sides respectively abut the second surface 220 and the fourth surface 240.

The fourth surface 240 is concave and has substantially four sides, wherein two of the four sides respectively abut the first side face 251 and the second side face 252, and one of the other two sides abuts the third surface 230.

The first surface 210 and the second surface 220 are closer to the opening 112 than the third surface 230, and the third surface 230 is closer to the opening 112 than the fourth surface 240. The fourth surface 240 is closer to the junction of the arm 122 and the housing 110 than the third surface 230.

Figure 3:
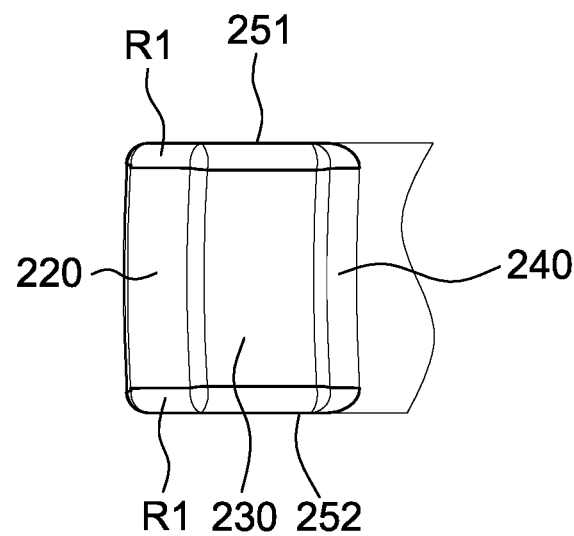
FIG. 3 illustrates that the protrusion on the latch of the fiber optic adapter of the present invention are formed with round edges R1.

Referring to FIG. 3, in the fiber optic adapter 100 of the present invention, the edges R1 (shown as thick black lines in the figure) between the first, second, third, fourth surfaces 210, 220, 230, 240 and the first, second side faces 251, 252 are not sharp. The non-sharp edges R1 are round edges and have a radius of curvature ranged from 0.1 mm to 0.7 mm, preferably 0.4 mm.

Figure 4:
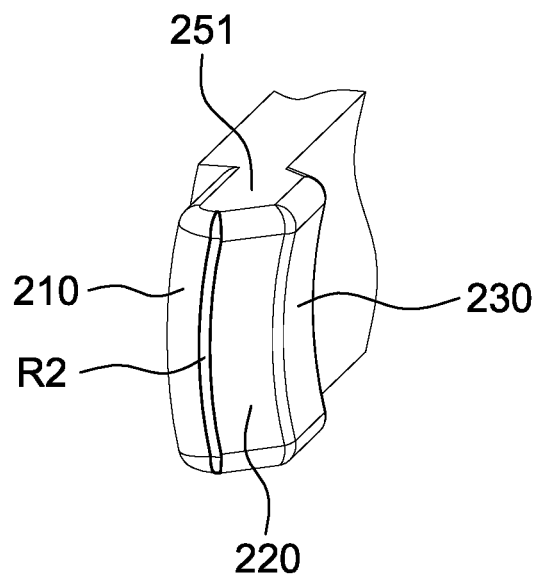
FIG. 4 illustrates that the protrusion on the latch of the fiber optic adapter of the present invention are formed with round edges R2.

Referring to FIG. 4, the edges R2 (shown as thick black lines in the figure) between the first surface 210 and the second surface 220 are not sharp. The non-sharp edges R2 are round edges and have a radius of curvature ranged from 0.3 mm to 0.9 mm, preferably 0.6 mm.

Figure 5:
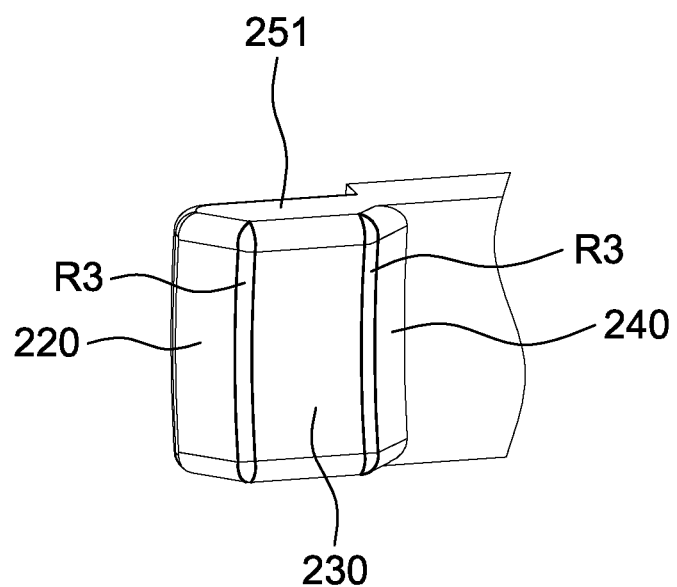
FIG. 5 illustrates that the protrusion on the latch of the fiber optic adapter of the present invention are formed with round edges R3.

Referring to FIG. 5, the edges R3 (shown as thick black lines in the figure) between the third surface 230 and the second, fourth surfaces 220, 240 are not sharp. The non-sharp edges R3 are round edges and have a radius of curvature ranged from 0.1 mm to 0.7 mm, preferably 0.4 mm.

Figure 6A:
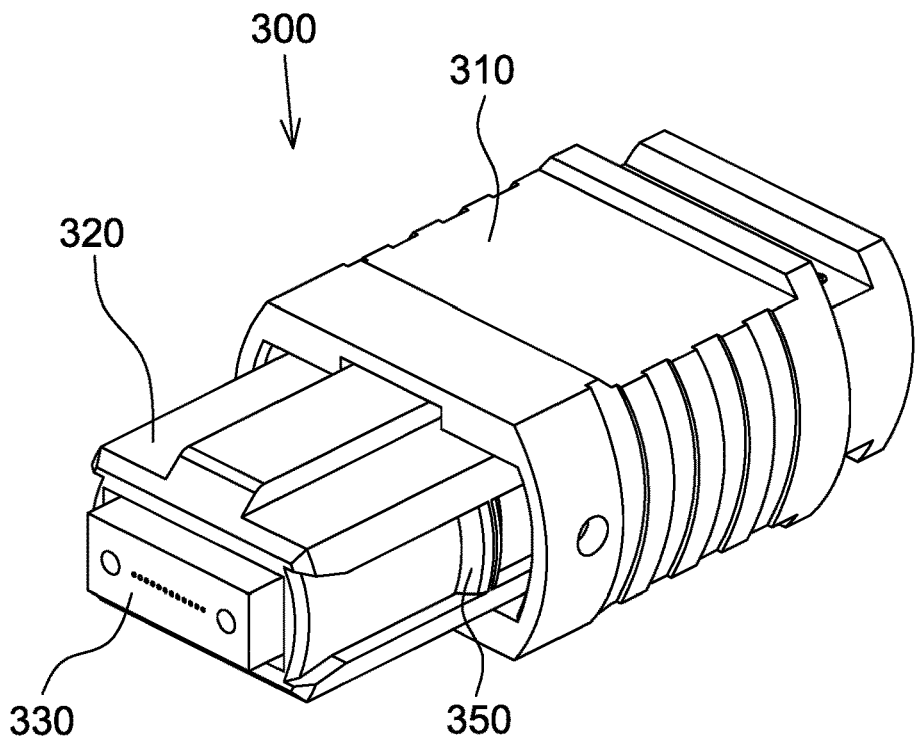
FIG. 6a is an elevated perspective view of the fiber optic connector of the present invention.
Figure 6B:
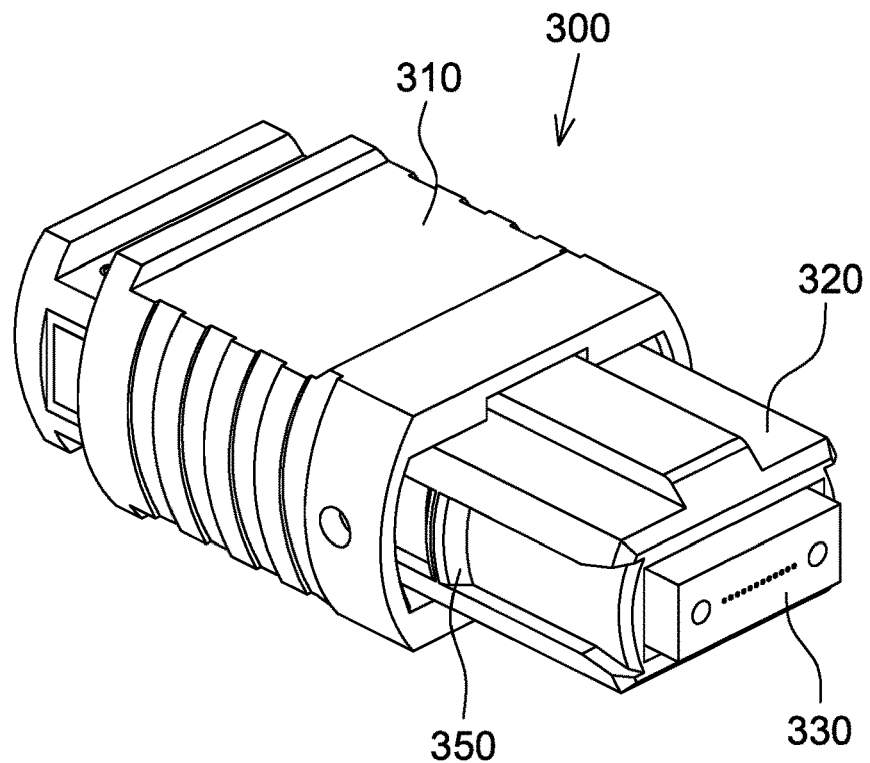
FIG. 6b is another elevated perspective view of the fiber optic connector of the present invention.

Referring to FIGS. 6a and 6b, the fiber optic connector 300 of the present invention, such as an MPO type fiber optic connector, includes an outer housing 310, an inner housing 320, and a fiber ferrule 330. Both the outer housing 310 and the inner housing 320 may be constructed of plastics by an injection molding process. The outer housing 310 is positioned to surround the inner housing 320, and the fiber ferrule 330 projects from the opening at the front end of the inner housing 320. Further, a protrusion 350 is formed on each of two opposing side walls of the inner housing 320. The other connector components are not illustrated in the figures for clarity.

Figure 7:
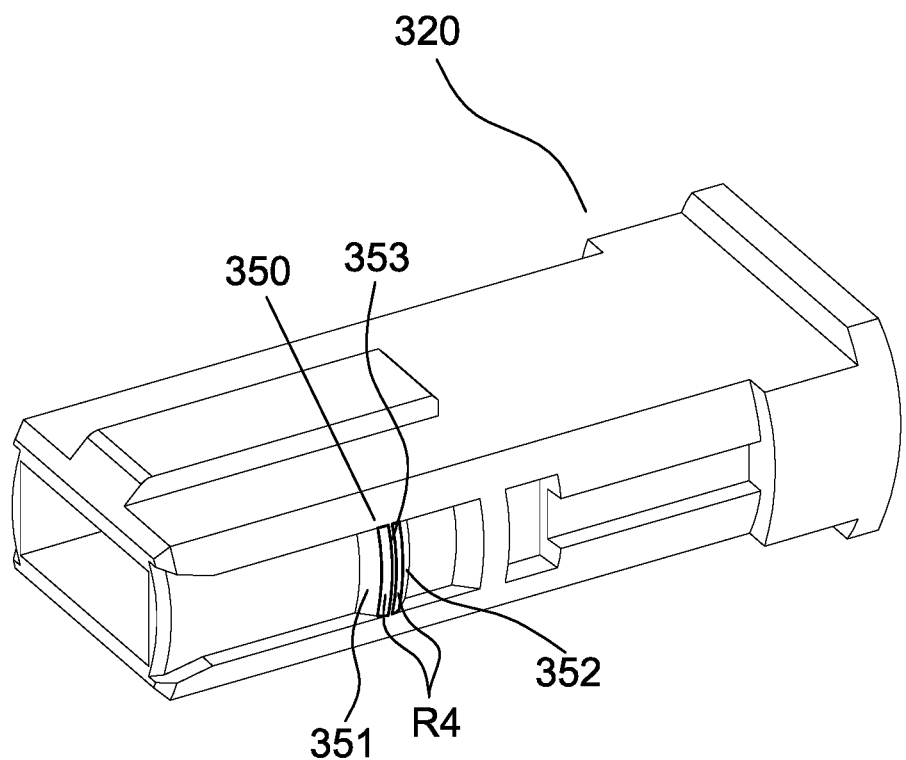
FIG. 7 is an elevated perspective view of the inner housing of the fiber optic connector of the present invention.

Referring to FIG. 7, each protrusion 350 has a top surface 353, a first inclined surface 351 and a second inclined surface 352. The top surface 353 is substantially rectangular and is located between the first inclined surface 351 and the second inclined surface 352. Two sides of the rectangular top surface 353 respectively abut the first inclined surface 351 and the second inclined surface 352. The edges R4 (shown as thick black lines in the figure) between the top surface 353 and the first, second inclined surfaces 351, 352 are not sharp. The non-sharp edges R4 are round edges and have a radius of curvature ranged from 0.05 mm to 0.8 mm, preferably 0.5 mm.

When the fiber optic connector 300 is inserted into the fiber optic adapter 100 from the opening 112, the two arms 122 will gradually bend outwardly, and the protrusions 124 on the two arms 122 will slide over the two protrusions 350, respectively. When the fiber optic connector 300 continues to be pushed, the second surfaces 220 on the protrusions 124 will first contact the first inclined surfaces 351 on the protrusions 350 and the third surfaces 230 will then slide over the top surfaces 353, respectively. Afterward, the arms 122 will gradually spring back and the fourth surfaces 240 on the protrusions 124 will slide over the second inclined surfaces 352 on the protrusions 350, respectively. FIG. 8 shows that the fiber optic connector 300 has been inserted into the fiber optic adapter 100, wherein the fiber ferrule 330 is not shown in the fiber optic connector 300 for clarity.

Figure 9A:
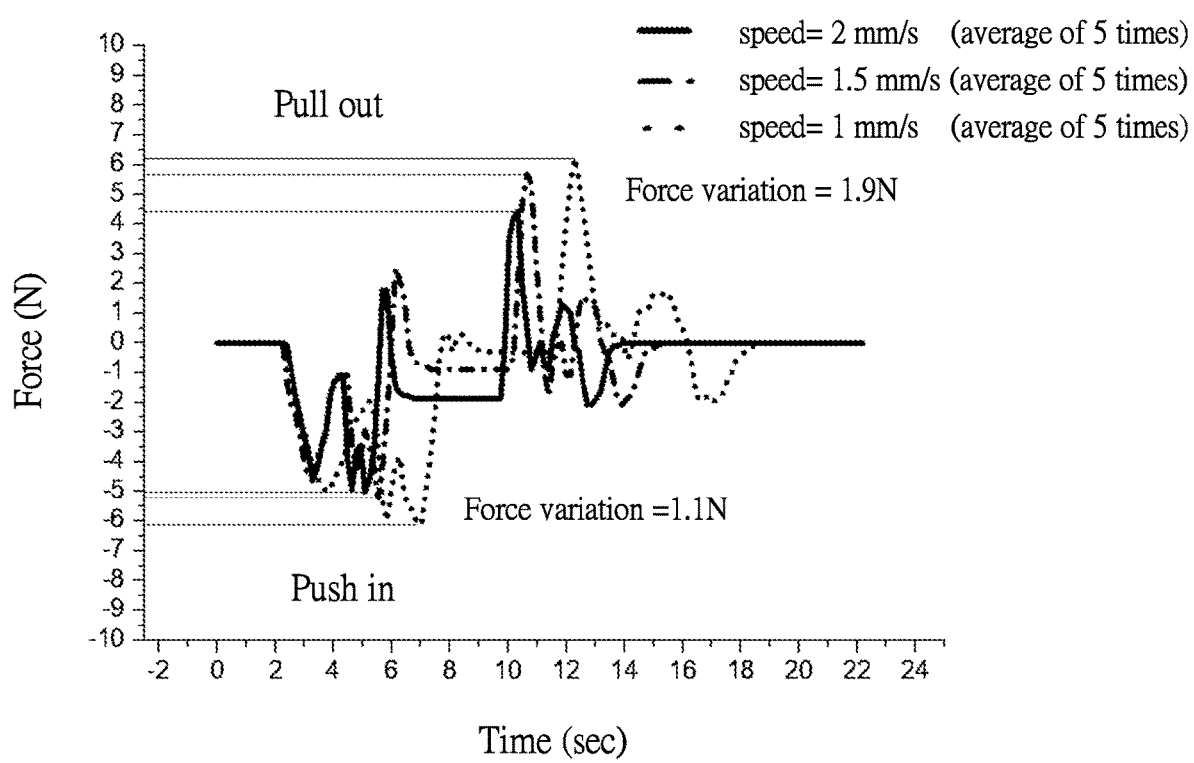
FIG. 9a illustrates the push-in and pull-out forces required for a fiber optic connector to insert into and remove from the fiber optic adapter of the present invention at a variety of different speeds.
Figure 9B:
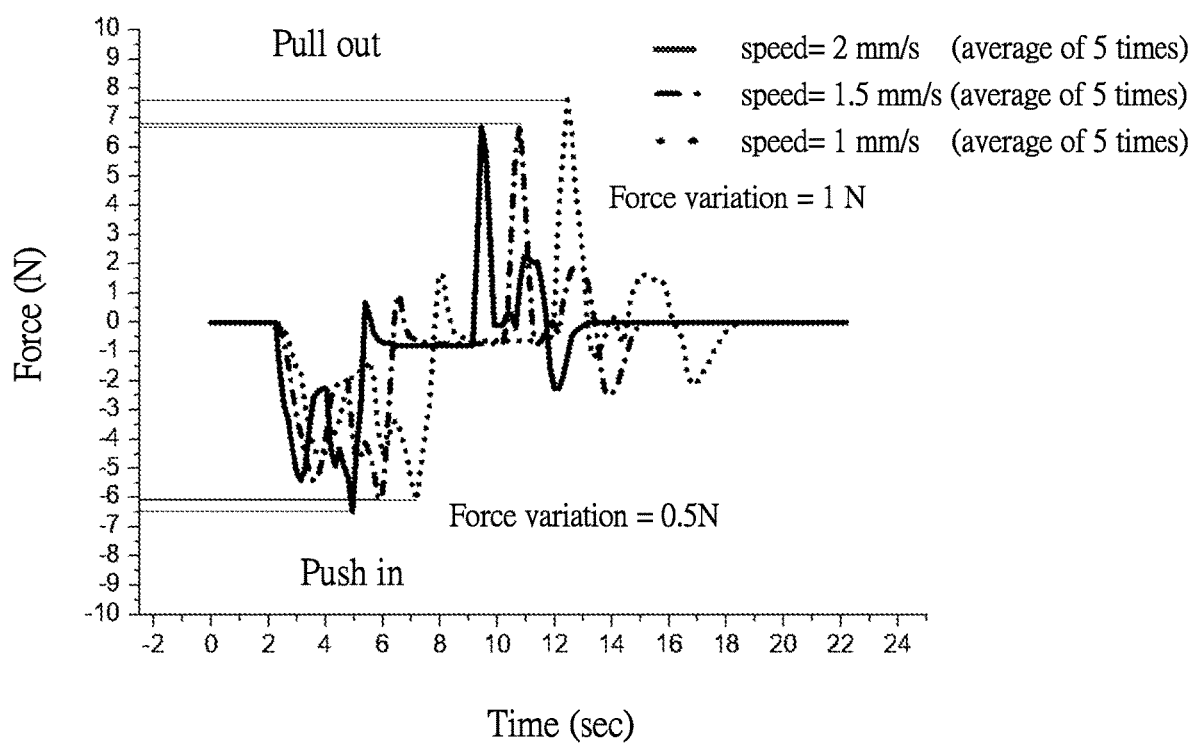
FIG. 9b illustrates the push-in and pull-out forces required for a fiber optic connector to insert into and remove from a conventional fiber optic adapter at a variety of different speeds.

In order to verify the advantages of the fiber optic adapter 100 of the present invention, please refer to FIGS. 9a and 9b. FIG. 9a illustrates the push-in and pull-out forces required for a fiber optic connector to insert into and remove from the fiber optic adapter 100 of the present invention at various speeds when the parameters R1, R2 and R3 of the protrusions 124 on the arms 122 of the fiber optic adapter 100 are 0.4 mm, 0.6 mm and 0.4, respectively. As shown in the figure, when the pushing or pulling of the fiber optic connector is fast (2 mm/sec), the kinetic frictions encountered by the fiber optic connector will be small and approach the lower limit (2.9N) specified by the IEC (International Electrotechnical Commission) standard. When the fiber optic connector is inserted and pulled out at a slow speed (1 mm/sec), the kinetic frictions become large and approach the upper limit (6.9N) of the IEC standard. The amount of change in the pushing force at different speeds is about 1.1N, and the amount of change in the pulling force is about 1.9N.

FIG. 9b illustrates the push-in and pull-out forces required for a fiber optic connector to insert into and remove from a conventional fiber optic adapter at various speeds when the corresponding parameters R1, R2, and R3 of the protrusions on the latches of the conventional fiber optic adapter are 0, 0.1 mm and 0, respectively. As shown in the figure, the kinetic frictions encountered by the fiber optic connector are larger than the corresponding kinetic frictions shown in FIG. 9a at different pushing and pulling speeds. Further, the amount of change in the pushing force at different speeds is about 0.5N, and the amount of change in the pulling force is about 1.0N. It can be seen that the corresponding friction encountered by a fiber optic connector inserted into or removed from the fiber optic adapter 100 of the present invention is less than being inserted into or removed from the conventional fiber optic adapter at comparing FIGS. 9a and 9b.

| Parameters of fiber optic adapter | Latch material 1 | Latch material 2 | Latch material 3 | Average debris counts generated on MPO fiber ferrule (particle size >25 μm) 50 times of mating | 100 times of mating |
|---|---|---|---|---|---|
| R1 = 0 | X | | | 50 | 150 |
| R2 = 0.1 mm | | X | | 10 | 50 |
| R3 = 0 | | | X | 30 | 120 |
| R1 = 0.4 mm | X | | | 0 | 30 |
| R2 = 0.6 mm | | X | | 2 | 6 |
| R3 = 0.4 mm | | | X | 0 | 3 |

Referring to the table above, it shows the number of particles dropped by the front end face of the fiber ferrule 330 of the fiber optic connector 300 when the fiber optic connector 300 (with the parameter R4 of the protrusions 350 of the inner housing 320 being 0.1 mm) is inserted into the fiber optic adapter 100 (with the parameters R1, R2, and R3 of the protrusions 124 on the latches 120 being 0.4 mm, 0.6 mm and 0.4 mm, respectively) of the present invention and into a conventional fiber optic adapter (with the corresponding parameters R1, R2, and R3 of the protrusions on the latches being 0, 0.1 mm and 0, respectively) many times. As can be seen from the data in the table, the number of debris dropped by the fiber optic connector 300 is significantly less regardless of the material used for the latches of the fiber optic adapter 100.

In general, a large friction can prevent a fiber optic connector from being inadvertently pulled from a fiber optic adapter. However, the large friction will increase debris dropped by the fiber optic connector due to surface wear. Therefore, the best way is to lower the required friction when the fiber optic connector is inserted and removed at a high speed (at normal use). The required friction for the fiber optic connector is increased when the fiber optic connector is inserted and removed at a lower speed (having an axial load).

Generally, a conventional fiber optic adapter is designed to have larger friction for the latches. However, the large friction will cause the surface wear and therefore increase the generation of debris. If a fiber optic adapter is designed to have a latch friction close to the lower limit of the IEC standard, there will be a risk that the inserted connector may slip off the adapter.

The fiber optic adapter and fiber optic connector of the present invention are in compliance with IEC standard. When the fiber optic adapter and fiber optic connector of the present invention are mated with the corresponding fiber optic connector and fiber optic adapter respectively, there will be less debris generated. More importantly, the fabrications of the fiber optic adapter and the fiber optic connector of the present invention do not require the use of special materials and thus the manufacturing cost is not increased.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A fiber optic adapter for mating with a fiber optic connector, the fiber optic connector having a first protrusion formed thereon, the fiber optic adapter comprising:
   a housing, the housing being hollow;
   an arm disposed in the housing, one end of the arm being coupled to the housing; and
   a second protrusion disposed on the arm, the second protrusion being configured to be engaged with the first protrusion on the fiber optic connector, the second protrusion having a first surface, a second surface, a third surface, a fourth surface, a first side face and a second side face, the first, second, third and fourth surfaces being connected to the first and second side faces, the second surface being located between the first surface and the third surface, the third surface being located between the second surface and the fourth surface, the fourth surface being closer to the junction of the arm and the housing than the third surface, wherein
   edges R3 are formed between the third surface and the second surface, and formed between the third surface and the fourth surface, the edges R3 are round edges and have a radius of curvature ranged from 0.1 mm to 0.7 mm,
   edges R2 are formed between the first surface and the second surface, the edges R2 being round edges and having a radius of curvature ranged from 0.3 mm to 0.9 mm, and
   edges R1 are formed between the first, second, third, fourth surfaces and the first, second side faces, the edges R1 being round edges and having a radius of curvature ranged from 0.1 mm to 0.7 mm.

2. The fiber optic adapter as claimed in claim 1, wherein the radius of curvature of the edges R3 is 0.4 mm.

3. The fiber optic adapter as claimed in claim 1, wherein the radius of curvature of the edges R2 is 0.6 mm.

4. The fiber optic adapter as claimed in claim 1, wherein the radius of curvature of the edges R1 is 0.4 mm.

5. The fiber optic adapter as claimed in claim 1, wherein the fiber optic adapter is an MPO type fiber optic adapter.

* * * * *